H. E. WRIGHT.
REBOUND SNUBBER.
APPLICATION FILED JUNE 7, 1916.
1,214,403.
Patented Jan. 30, 1917.
2 SHEETS—SHEET 1.
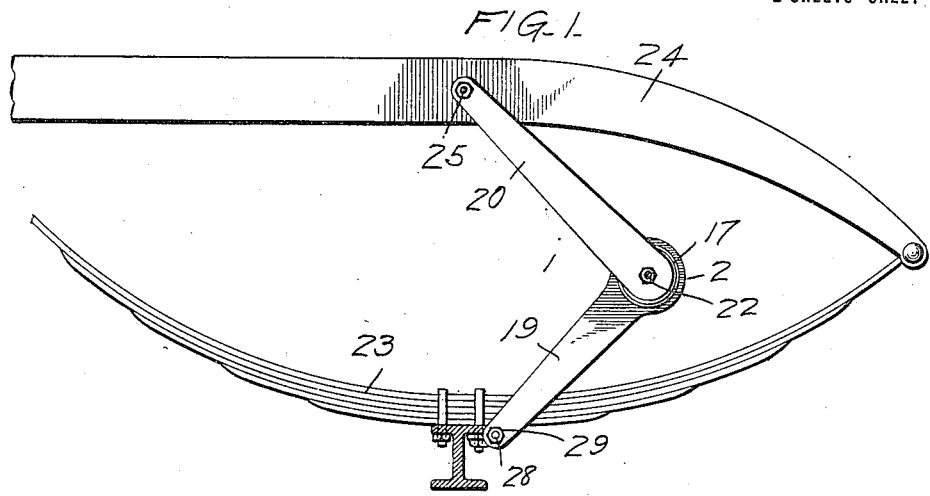
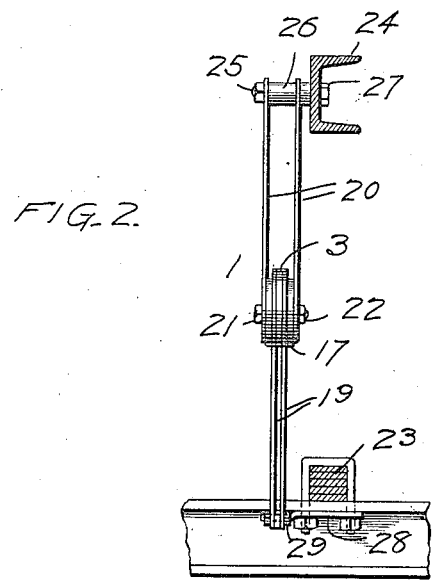
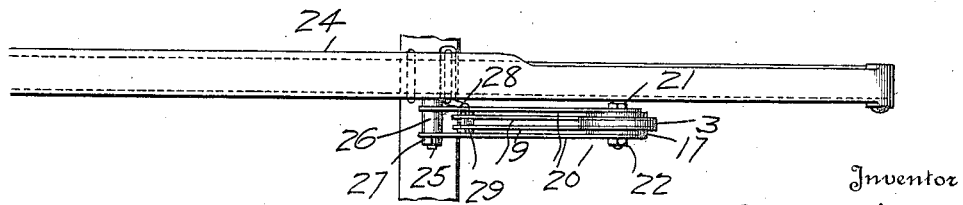
Inventor
Harry E Wright
By Percy H. Moore
Attorney

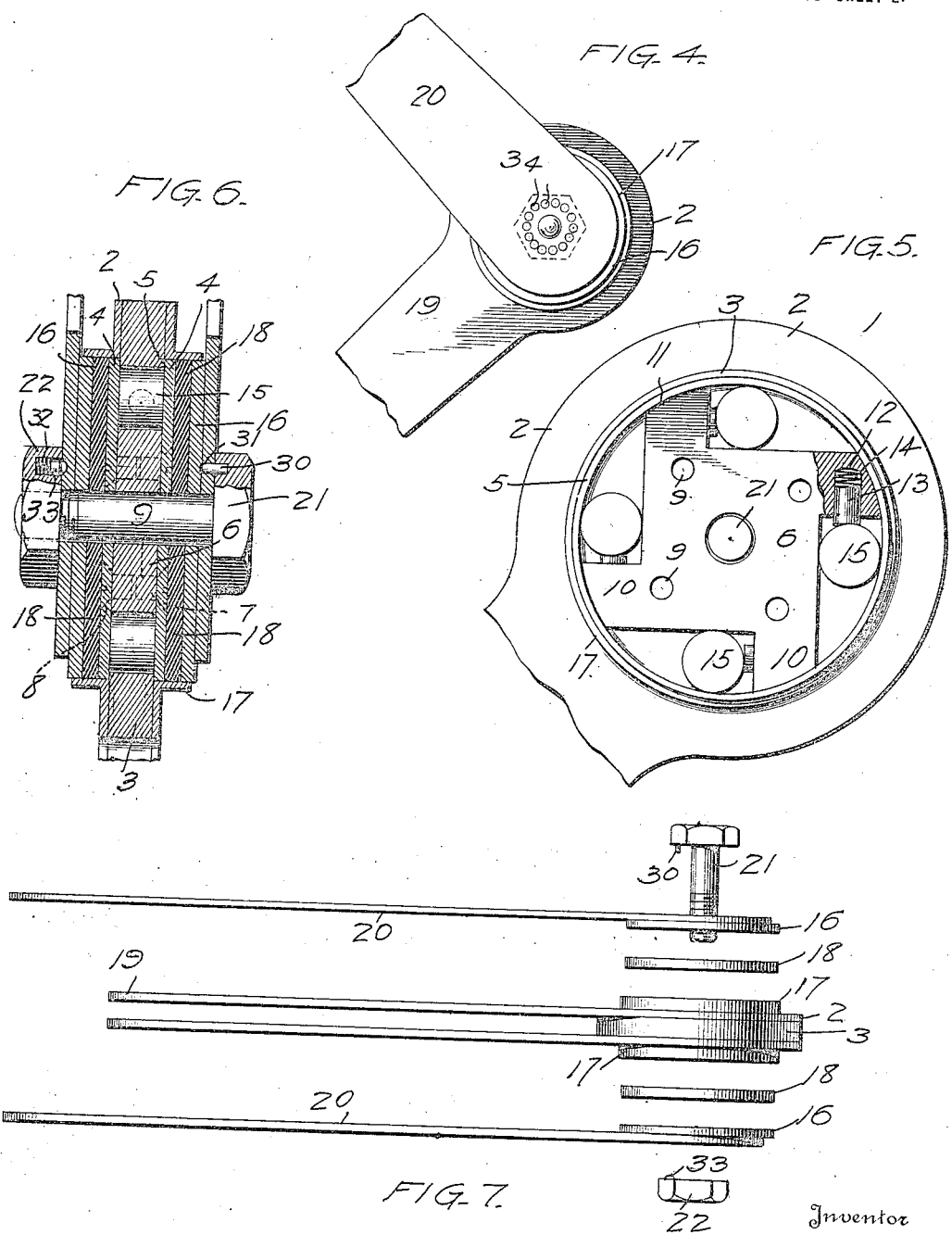

UNITED STATES PATENT OFFICE.

HARRY E. WRIGHT, OF SPOKANE, WASHINGTON.

REBOUND-SNUBBER.

1,214,403.

Specification of Letters Patent.   Patented Jan. 30, 1917.

Application filed June 7, 1916. Serial No. 102,533.

*To all whom it may concern:*

Be it known that I, HARRY E. WRIGHT, residing at 1124 Sprague avenue, Spokane, Washington, have invented certain new and useful Improvements in Rebound-Snubbers, of which the following is a specification.

This invention relates to improvements in shock absorbers for vehicles and has for its object to check and prevent shocks and jolts due to excessive rebound of a spring supported vehicle body incident to the wheels of the vehicle passing over obstructions in a road. It is a well known fact that springs seldom if ever break under the downward pressure of a vehicle when hitting a bump or hole but that the break always occurs on the rebound.

The present invention is designed to reduce if not entirely eliminate the danger of such breakage.

With these and other objects in view the invention consists in certain novel features of construction; arrangement and combination of parts as will be hereinafter fully described and pointed out in the claims, reference being had to the accompanying drawings in which—

Figure 1 is a side elevation of the device as in use; Fig. 2 is a front elevation; Fig. 3 is a top plan view; Fig. 4 is an enlarged detail view partly broken away showing the anti friction nut in dotted lines; Fig. 5 is a side elevation partly broken away of the intermediate lever arm with inclosed mechanism; Fig. 6 is a sectional view of the assembled device and Fig. 7 is a plan view of the lever arms, washers, nuts and bolts detached.

Referring more particularly to the drawings the numeral 1 designates a casing comprising a pair of flanged annular members 2, an intermediate annular member 3 and removable side plates 4. The inner face of the intermediate member, it will be noted extends beyond the inner face of the flanged members providing in effect a shoulder 5 against which the side plates bear. Inclosed within the casing is a substantially rectangular clutch or brake member 6, the function and detailed construction of which will be described hereinafter. The plates 4 are secured together and to the brake member by means of screws 7 passing through suitable countersunk openings 8 in the plates 4 and into corresponding threaded openings 9 in the brake member thus securely, but detachably connecting said parts together.

The four corners of the member 6 are each formed with an integral extension 10 the extremities 11 of which are curved to conform to the curvature of the intermediate annular member 3 which they frictionally engage. Mounted in recess 12 formed in these extensions are a plurality of plungers 13 (one for each extension) the outer ends of which are held by means of springs 14 in resilient engagement with rollers 15 for a purpose about to be described.

A pair of disks 16 placed in superposed relation upon the side plates 4 fit snugly within the confines of the flanges 17 formed on the flanged annular members 2, washers 18 being preferably interposed between said disk and annular members. The flanged disk and annular members are formed with integral annular members are formed with integral extensions forming in effect a bifurcated lever arm 19, when the parts are in assembled position. The disks 16 are also each provided with a lever arm 20, said arms being connected to the disks as by welding or any other suitable means, or the arms 20 may be integrally formed.

To assemble the parts and install the device on an automobile the brake member 6 and rollers 15 are inserted within the casing as illustrated in Fig. 5, the side plates 4, washers 18 and disks 16 being relatively placed as shown in Fig. 6 and the whole clamped together by headed bolt 21 and nut 22. Then the bifurcated lever arms 19 and 20 are pivotally connected to the spring 23 and chassis 24 of the vehicle by any suitable means. The means illustrated in Figs. 1, 2 and 3 comprise a bolt 25, spacer blocks 26 and nuts 27 for securing the arms 20 to the chassis while a threaded member 28 and nuts 29 serve to connect the arm 19 to the spring 23.

The headed bolt 21 is provided with a pin 30 adapted to seat in a corresponding recess 31 formed in one of the lever arms 20, thus preventing independent rotation of these parts. Seated in a recess 32 formed in the inner face of the nut 22 is a spring pressed plunger 33 adapted to seat in one of the depressions 34, formed in the outer face of the other lever arm 20 when the nut 22 is screwed home. It will thus be seen that when the vehicle passes over an obstruction the arms 20 and 19 are caused to approach one another. During this movement the washers 18, side plates 4 and brake member 6 rotate freely within the casing in a clockwise direction, viewing Figs. 4 and 5, but upon rebound of the vehicle the reverse of this movement is retarded or entirely checked by the wedging action of the rollers 15 which are forced into gradually increasing frictional contact with the approaching opposing faces of the member 6 and periphery of the intermediate annular member 3, as the member 6 rotates in an anticlockwise direction.

What I claim is:

1. In a device of the kind described a casing comprising a pair of flanged annular members and an intermediate annular member therebetween, the inner peripheral face of said intermediate member extending beyond the inner face of the flanged members to form a shoulder, removable side plates and disks seated within said flanged annular members and bearing against said shoulder, a brake member within said casing readily rotatable in a clockwise direction, means for retarding the rotation of said brake member in an anticlockwise direction, lever arms formed on said disks adapted to be connected to the chassis and lever arms on said flanged annular members adapted to be connected to the springs of a vehicle.

2. In a shock absorber a casing comprising a pair of flanged annular members and an intermediate annular member, a pair of side plates and disks nested within said flanged member, a substantially rectangular brake member inclosed within said casing, the four corners of said brake member having extensions adapted to frictionally engage the inner periphery of said intermediate annular member, levers secured to said disk adapted to be connected to the chassis and a lever formed on said flanged annular member adapted to be connected to the spring of a vehicle, means permitting clockwise movement of said brake member in said casing when said levers approach each other, said means retarding the anticlockwise movement of said brake member when said levers are moved in an opposite direction.

In testimony whereof I affix my signature.

HARRY E. WRIGHT.